(12) United States Patent
Nakazawa et al.

(10) Patent No.: US 7,538,837 B2
(45) Date of Patent: May 26, 2009

(54) COLOR FILTER AND METHOD FOR MANUFACTURING THE SAME

(75) Inventors: Shinsuke Nakazawa, Tokyo (JP); Akira Inoue, Tokyo (JP); Shunsuke Sega, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 594 days.

(21) Appl. No.: 11/148,916

(22) Filed: Jun. 9, 2005

(65) Prior Publication Data
US 2006/0057477 A1  Mar. 16, 2006

(30) Foreign Application Priority Data
Jun. 16, 2004  (JP) ............................. 2004-178490

(51) Int. Cl.
*G02F 1/1335* (2006.01)
*G02F 1/13* (2006.01)

(52) U.S. Cl. ...................................... 349/106; 349/187

(58) Field of Classification Search ......... 349/106–109, 349/187
See application file for complete search history.

(56) References Cited

U.S. PATENT DOCUMENTS
7,129,466 B2 * 10/2006 Iwasaki ................... 250/214.1

FOREIGN PATENT DOCUMENTS
JP   06-11613   1/1994

* cited by examiner

*Primary Examiner*—Dung T. Nguyen
(74) *Attorney, Agent, or Firm*—Ladas & Parry LLP

(57) ABSTRACT

A color filter having no light leakage when incorporated into a liquid crystal display, and also, those in which pseudo-defects are scarcely detected in the color filter defect inspection is provided. Also provided is a method for manufacturing the same. The color filter includes a transparent substrate; a light shielding part, formed on the transparent substrate, containing at least a light shielding material and a resin; and a pixel part formed on an opening of the light shielding part on the transparent substrate.

4 Claims, 2 Drawing Sheets

COLOR FILTER AND METHOD FOR MANUFACTURING THE SAME

BACKGROUND OF THE INVENTION

1. Field of the Invention

The present invention relates to a color filter used in a liquid crystal display and a method for manufacturing the same.

2. Description of the Related Art

In a liquid crystal display, a transparent substrate on a color filter side and a substrate on a liquid crystal driving side are opposed to each other, and a liquid crystal compound is encapsulated therebetween to form a thin liquid crystal layer. And a display is carried out by selectively changing the quantity of transmissive light or reflective light from the color filter by electrically regulating the liquid crystal alignment in the liquid crystal layer by the substrate on the liquid crystal driving side.

Such liquid crystal display is driven by various driving systems such as a static driving system, a simple matrix system and an active matrix system. However, in recent years, color liquid crystal displays using a liquid crystal panel of the active matrix system or simple matrix system are rapidly spreading as flat displays in personal computers and portable information terminals.

FIG. 3 shows one example of a liquid crystal display panel of the active matrix system. A liquid crystal display 101 has a structure wherein: a color filter 11 and a TFT array substrate 12, which is the substrate on a liquid crystal driving side, are opposed to each other with a gap 13 of about 1 to 10 μm therebetween; this gap 13 is filled with a liquid crystal L; and around thereof is sealed with a sealing material 14. The color filter 11 has a structure wherein, on a transparent substrate 15, a black matrix layer 16 formed in a predetermined pattern for light shielding the boundaries among pixels, pixel parts 17 of which a plurality of colors (usually three primary colors of red (R), green (G) and blue (B)) aligned in a predetermined alignment for forming each pixel, a protective film 18, and a transparent electrode film 19 are laminated in this order from the side of the transparent substrate.

On the other hand, the TFT array substrate 12 has a structure wherein a TFT element is aligned on a transparent substrate, and a transparent electrode film 21 is provided. An alignment film 20 is provided on the inner side of the color filter 11 and on the opposing TFT array substrate 12. A color image is obtained by regulating the light transmittance of the liquid crystal layer placed on the back of a pixel colored in each color.

Generally, the transparent electrode provided on the TFT array substrate side is formed for each pixel part with a width wider than that of the pixel part of the color filter. However, for example, when the edge side of the light shielding part, that is, the boundary between the light shielding part and the pixel part, is ragged (ragged refers to a state wherein a pattern is rough around the edges), the width of the pixel part is enlarged so that the pixel part partially exceeds from the opposing transparent electrode. In this case, voltage is not applied to the liquid crystal on the pixel part, which exceeds from the opposing transparent electrode, so that there is a problem of light leakage from this part.

Inspection of defects such as scratches and unevenness of a pixel part in a color filter is carried out by irradiating light having predetermined intensity from the backside of the color filter and measuring the intensity of light quantity transmitted through each pixel part. However, when the edge side of the light shielding part is ragged, there is a problem that, since the intensity of light quantity is changed, defects (pseudo-defects) are detected even if there are no defects in the pixel part.

SUMMARY OF THE INVENTION

Accordingly, there is a demand for a color filter with no light leakage etc. when incorporated into a liquid crystal display, wherein pseudo-defects are scarcely detected in the color filter defect inspection, and a method for manufacturing the same.

The present invention provides a color filter comprising: a transparent substrate; a light shielding part, formed on the transparent substrate, containing at least a light shielding material and a resin; and a pixel part formed at an opening of the light shielding part on the transparent substrate, wherein when an edge side shape, in a range of 100 μm to 200 μm in length, of the light shielding part is converted into coordinate data having coordinate points in a range of 1000 points to 10000 points, and an approximate line is calculated from the coordinate points by least-square method: a standard deviation $$\sigma \left( = \sqrt{\frac{1}{n} \sum_i X_i^2} \right)$$

(wherein n is a number of the coordinate points in the coordinate data), when $X_i$ is a distance from each coordinate point to the approximate line, is 0.2 or less; and in a graph of the coordinate data, when an apex of a peak projecting upward is referred to as an upper apex and an apex of an peak projecting downward is referred to as a lower apex, among the peaks whose distance from the approximate line is 1.0 μm or more, a distant between the adjacent upper apexes and a distant between the adjacent lower apexes are 5.0 μm or more on average.

In the present invention, when the edge side shape of the light shielding part is converted into coordinate data, since the standard deviation of distance from the approximate line is in the above-described range, there are few coordinate points deviated significantly from the approximate line, and significant ragged part can be reduced. Moreover, since the distance between adjacent upper apexes and the distance between adjacent lower apexes are the predetermined value or longer, it can be said that the distance between ragged parts larger than the predetermined value is relatively long, and as a whole, the ragged parts larger than the predetermined value can be reduced. Accordingly, the color filter of the present invention can be used in a liquid crystal display, as a color filter causing little light leakage due to a pixel part exceeding from -he opposing transparent electrode, and causing few pseudo-defects at the time of defect inspection of the color filter.

The present invention also provides a liquid crystal display using the above-described color filter.

In the present invention, a liquid crystal display free of light leakage etc. can be produced with high yield by using the color filter with few ragged parts on the edge side of the light shielding part.

Further, the present invention provides a method for manufacturing a color filter, wherein the color filter comprises: a transparent substrate; a light shielding part, formed on the transparent substrate, containing at least a light shielding material and a resin; and a pixel part formed at an opening of the light shielding part on the transparent substrate, and the method for manufacturing a color filter comprises a selecting step in which following color filter is selected: a color filter characterized in that, when an edge side shape, in a range of 100 µm to 200 µm in length, of the light shielding part is converted into coordinate data having coordinate points in a range 1000 points to 10000 points, and an approximate line is calculated from the coordinate points by least-square method, a standard deviation $$\sigma\left(=\sqrt{\frac{1}{n}\sum_i X_i^2}\right)$$

(wherein n is a number of the coordinate points in the coordinate data), when $X_i$ is a distance from each coordinate point to the approximate line, is 0.2 or less, and in a graph of the coordinate data, when an apex of a peak projecting upward is referred to as an upper apex and an apex of an peak projecting downward is referred to as a lower apex, among the peaks whose distance from the approximate line is 1.0 µm or more, a distant between the adjacent upper apexes and a distant between the adjacent lower apexes are 5.0 µm or more on average.

In the present invention, the method comprises the selecting step of selecting a color filter wherein, when the edge side shape of the light shielding part is converted into coordinate data, the standard deviation, in the edge side of the light shielding part, from the approximate line is in the above-described range, and the distance between adjacent upper apexes and the distance between adjacent lower apexes are the predetermined value or longer. Therefore, a color filter with few ragged parts on the light shielding part can be produced so that a high-quality color filter, in which few pseudo-defects are detected in a step of inspecting defects of the pixel part, can be efficiently produced.

Further, the present invention provides a method for manufacturing a color filter, wherein the color filter comprises: a transparent substrate; a light shielding part, formed on the transparent substrate, containing at least a light shielding material and a resin; and a pixel part formed at an opening of the light shielding part on the transparent substrate, and the method for manufacturing a color filter comprises: a pre-baking step of coating a light shielding part forming material, containing a light shielding material and a resin, onto the transparent substrate and heating thereof; a light exposing step of exposing the heated light shielding part forming material, to light, in a light shielding part forming pattern; a developing step of removing the light shielding part forming material of an insoluble part with a shower; and an adjusting step of adjusting conditions in each of the said steps preliminarily so that, when an edge side shape, in a range of 100 µm to 200 µm in length, of the formed light shielding part is converted into coordinate data having coordinate points in a range of 1000 points to 10000 points, and an approximate line is calculated from the coordinate points by least-square method, a standard deviation $$\sigma\left(=\sqrt{\frac{1}{n}\sum_i X_i^2}\right)$$

(wherein n is a number of the coordinate points in the coordinate data), when $X_i$ is a distance from each coordinate point to the approximate line, is 0.2 or less, and in a graph of the coordinate data, when an apex of a peak projecting upward is referred to as an upper apex and an apex of an peak projecting downward is referred to as a lower apex, among the peaks whose distance from the approximate line is 1.0 µm or more, a distant between the adjacent upper apexes and a distant between the adjacent lower apexes are 5.0 µm or more on average.

In the present invention, the adjusting step, for adjusting each step of the light shielding part formation, is previously carried out such that, when the edge side shape of the formed light shielding part is converted into coordinate data, the standard deviation of the edge side of the light shielding part from the approximate line is in the above-described range, and the distance between adjacent upper apexes and the distance between adjacent lower apexes are a predetermined value or longer. Therefore, a high-quality color filter free of light leakage, whose edge side of the light shielding part having the above-described shape, can be easily manufactured.

According to the present invention, there can be provided a color filter with few ragged parts in the edge side of the light shielding part, causing little leakage due to the pixel part exceeding from the opposing transparent electrode when used in a liquid crystal display, and few pseudo-defects are defected in a defect inspection of the color filter.

DESCRIPTION OF THE PREFERRED EMBODIMENT

The present invention relates to a color filter with no light leakage etc. when incorporated into a liquid crystal display in which pseudo-defects are not detected in a pixel part inspection, a liquid crystal display using the color filter and a method for manufacturing the same. Hereinafter, these are separately described.

A. Color Filter

The color filter of the present invention is a color filter comprising: a transparent substrate; a light shielding part, formed on the transparent substrate, containing at least a light shielding material and a resin; and a pixel part formed at an opening of the light shielding part on the transparent substrate, wherein when an edge side shape, of a predetermined length, of the light shielding part is converted into coordinate data having coordinate points in a predetermined range of points, and an approximate line is calculated from the coordinate points by least-square method:

a standard deviation $$\sigma\left(=\sqrt{\frac{1}{n}\sum_i X_i^2}\right)$$

(wherein n is a number of the coordinate points in the coordinate data), when $X_i$ is a distance from each coordinate point to the approximate line, is a predetermined value or less; and in a graph of the coordinate data, when an apex of a peak projecting upward is referred to as an upper apex and an apex of an peak projecting downward is referred to as a lower apex, among the peaks whose distance from the approximate line is a predetermined value or more, a distant between the adjacent upper apexes and a distant between the adjacent lower apexes are a predetermined value or more on average.

Figure 2:
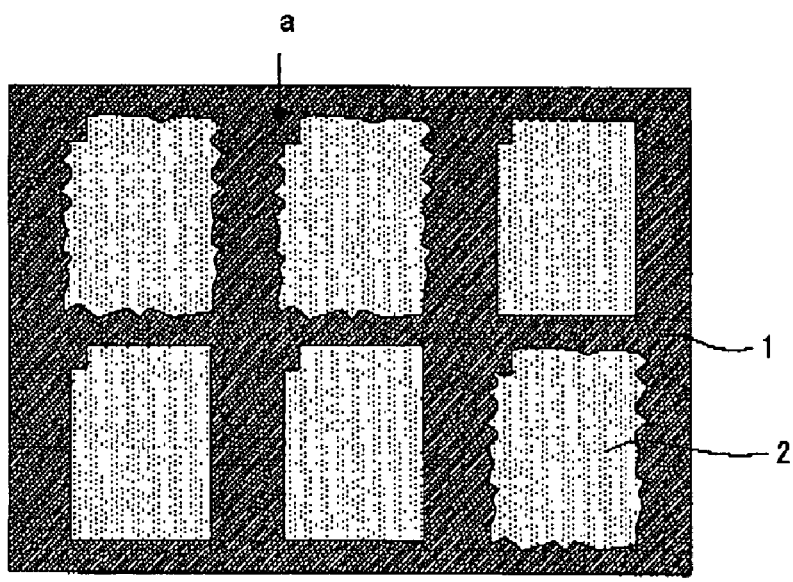
FIG. 2 is an illustration explaining the light shielding part used in the present invention.
Figure 3:
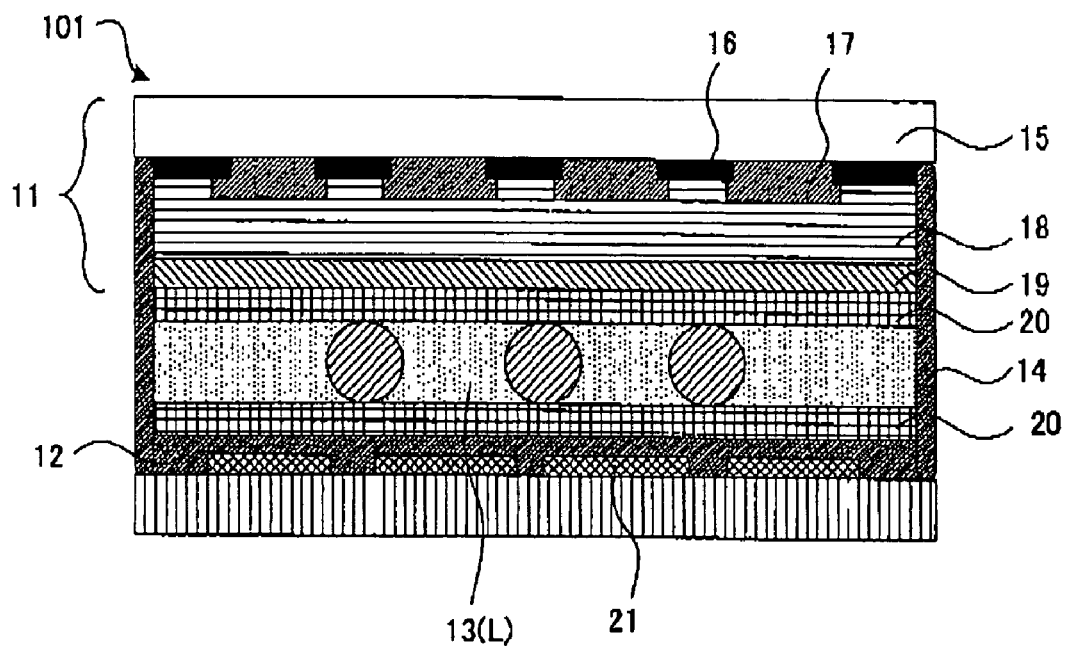
FIG. 3 is an illustration explaining a general liquid crystal display.

For example, when the edge side a of a light shielding part 1 is significantly ragged as shown in FIG. 2, a pixel part 2 is formed exceeding from an objective region. Accordingly, when the color filter is used in a liquid crystal display, the pixel part will be exceeding from a region, where the opposing transparent electrode is formed, to cause light leakage in some cases.

If the edge side of the light shielding part is ragged as described above, when defects of a pixel part is inspected by measuring the strength of transmissive light through the pixel part, since the area of the pixel part varies from the objective pixel part area, pseudo-defects are defected, as if defects have occurred although there is no problem in the pixel part.

Figure 1:
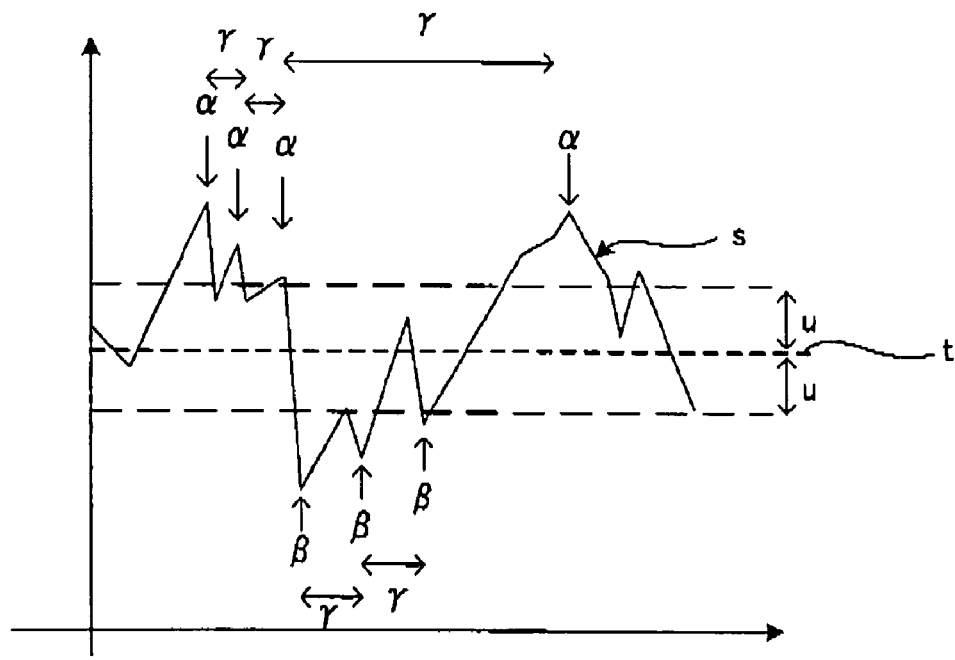
FIG. 1 is an illustration explaining coordinate data of the edge side of the light shielding part of the color filter of the present invention.

Therefore, the color filter in the present invention is formed such that the edge side of the light shielding part, that is, the shape of the boundary between the light shielding part and the pixel part, has the predetermined shape. Specifically, a part of the edge side of the light shielding part is converted into coordinate data s having predetermined ranged number of coordinate points, as shown in FIG. 1, and the color filter is formed such that the standard deviation a, relating to a distance from an approximate line t calculated from the data by the least-square method, is within the predetermined range. The distance between the approximate line t and each coordinate data s is referred to as the minimum length from each coordinate data s to the approximate line t. Moreover, the color filter is formed such that, among the peaks larger than the predetermined value u from the approximate line t, when an apex of a peak projecting upward is referred to as an upper apex α and an apex of a peak projecting downward is referred to as a lower apex β, the distance γ between adjacent upper apexes a and the distance γ between adjacent lower apexes β are the predetermined value or more on average.

Since the standard deviation σ is in the predetermined range, the number of points deviating from the approximate line can be reduced, that is, the size of the ragged part can be reduced. Further, since the distance between apexes deviating from the average, by the predetermined value or more, is long, the number of significantly ragged Darts can be reduced as a whole. Accordingly, when the color filter of the present invention is used in a liquid crystal display, light leakage etc. seldom occurs and the pseudo-defects described above are not detected.

The color filter of the present invention shall have the above-described shape in the edge side of every light shielding part. Normally, whether the edge side of every light shielding part has the above-described shape or not is determined by measuring arbitrary 3 pixels to 100 pixels in one color filter. In the edge side shape in each pixel, the most ragged part of the linear part in a pixel is selected by eye observation, and a range of 100 μm to 200 μm is measured.

In the present invention, in a combination of the distance measured in the above-described range and the number of coordinate data in the below-described range, at least one of the below-described standard deviation, the distance between adjacent upper apexes and the distance between adjacent lower apexes shall be within the below-described range.

The method for converting the edge side shape of the light shielding part into coordinate data includes: a method wherein an edge of the edge side shape of predetermined length is detected by a short-measure measuring instrument or a 2-dimensional coordinate measuring instrument, and each detected point is converted into absolute-size coordinates; or a method wherein an edge is detected by taking a photograph of the edge side in and subjecting the photograph to image processing, and after resoluting into points, the coordinates of each of 1000 to 10000 points are determined.

The standard deviation is obtained by calculating an approximate line, by the least-square method, from the coordinate points obtained by the above-described methods, and then, calculating the following standard deviation:

$$\sigma \left( = \sqrt{\frac{1}{n} \sum_i X_i^2} \right)$$

wherein $X_i$ is the distance from each coordinate point to the approximate line. In the above, n is the number of the coordinate points in the coordinate data. In the present invention, the standard deviation σ is preferably 0.2 or less, more preferably 0.1 or less. Thereby, the width of the ragged part of the edge side of the light shielding part can be reduced.

In peaks that are deviating from the approximate line by 1.0 μm or more, an average of each distance between adjacent upper apexes and each distance between adjacent lower apexes is preferably 5.0 μm or more, more preferably 10 μm or more. Significantly ragged parts can thereby be reduced as a whole. The peak that is deviating from the approximate line by the above-described value refers to a peak of which at least its apex is apart from the approximate line by an absolute value of the above-described value.

In the present invention, the above-described standard deviation and the distance between adjacent upper apexes and the distance between adjacent lower apexes, which are deviating from the approximate line by the predetermined value or more, are within the above-described range. Therefore, a high quality color filter with no light leakage when used in a liquid crystal display, in which no pseudo-defects are detected in a defect inspection of the pixel part, can be obtained. Whether light leakage occurs or not can be inspected by, after preparing a liquid crystal display by attaching the color filter to an opposing substrate (TFT side), examining the presence and absence of bright points indicating light leakage when black is displayed on the entire surface.

Hereinafter, the each constitution used in the color filter of the present invention is described in detail.

1. Light Shielding Part

First, the light shielding part used in the color filter of the present invention is described. The light shielding part used in the color filter of the present invention is not particularly limited as long as it is formed on the transparent substrate described later, which contains a resin and a light shielding material, and it is formed so as to have the above-described edge side. And the light shielding part can be formed by photolithography method etc. using a light shielding part forming material for forming a general resin light shielding part.

As the method for forming the edge side into the above-described shape, for example, there is a method wherein the below-described light shielding part forming material having photo sensitivity is coated on the entire surface of the transparent substrate, and a disposition distance between a photomask for pattern-light exposure and the surface of the light shielding part forming material is reduced. When the distance between the photomask and the surface of the light shielding part forming material is long, irradiated light is diffracted to blur the pattern and the ragged part likely to occur.

Generally, a pre-baking step of heating the coated-light shielding part forming material is carried out before the light exposure of the light shielding part forming material, and by optimizing the temperature in this pre-baking, the light shielding part can be formed to have the above-described edge side shape. When the temperature in the pre-baking is high, removal of an insoluble part in a developing step after the light exposure will be difficult, thus the ragged part tends to occur. On the other hand, when the pre-baking temperature is low, curing will be insufficient, and the light shielding part forming material of the light shielding part in an object region will also be removed by development, thus the ragged part tends to occur.

Moreover, for example, a method wherein, in the developing step after the light exposure of the light shielding part forming material, a shower pressure which removes the light shielding part forming material of regions other than the objective region is reduced, can also be listed. This is because when the shower pressure is high, the light shielding part forming material of a region, on which the light shielding part is formed, is also removed by pressure to cause the ragged part in some cases.

Also, by optimizing the developing time, the edge side shape can be formed as described above. When the developing time is short, removal of an insoluble part is difficult, thus the ragged part occurs. On the other hand, when the developing time is long, the light shielding part forming material of the light shielding part in an object region is also removed, thus the ragged part occurs.

Optimization of these conditions is selected suitably depending on the type of the light shielding part forming material, an apparatus, and the objective color filter.

The material used to form the above-described light shielding part is not particularly limited as long as it contains at least a light shielding material and a resin. Usually, a photo-initiator, a monomer and the like are added to a light shielding material and resin to form a light shielding part forming composition which can be used to form the light shielding part.

As the light shielding material, a material used in a resin light shielding part, generally used in a color filter, can be used. Examples thereof include light shielding particles such as carbon fine particles, titanium oxide, titanium black, titanium fine particles, metal oxide, inorganic pigment and organic pigment.

Examples of the resin contained in the light shielding part used in the present invention include an ethylene/vinyl acetate copolymer, ethylene/vinyl chloride copolymer, ethylene/vinyl copolymer, polystyrene, acrylonitrile/styrene copolymer, ABS resin, polymethacrylic acid resin, ethylene/methacrylic acid resin, polyvinyl chloride resin, chlorinated vinyl chloride, polyvinyl alcohol, cellulose acetate propionate, cellulose acetate butyrate, nylon 6, nylon 66, nylon 22, polyethylene terephthalate, polybutylene terephthalate, polycarbonate, polyvinyl acetal, polyether ether ketone, polyether sulfone, polyphenylene sulfide, polyarylate, polyvinyl butyral, epoxy resin, phenoxy resin, polyimide resin, polyamide imide resin, polyamic acid resin, polyether imide resin, phenol resin, urea resin etc.

Further examples of the resin include polymers and copolymers of: one or more selected from polymerizable monomers of methyl(meth)acrylate, ethyl(meth)acrylate, n-propyl (meth)acrylate, isopropyl(meth)acrylate, sec-butyl (meth)acrylate, isobutyl(meth)acrylate, tert-butyl(meth) acrylate, n-pentyl(meth)acrylate, n-hexyl(meth)acrylate, 2-ethylhexyl(meth)acrylate, n-octyl(meth)acrylate, η-decyl (meth)acrylate, styrene, α-methyl styrene, N-vinyl-2-pyrrolidone and glycidyl (meth)acrylate; and one or more selected from (meth)acrylic acid, an acrylic acid dimer (for example, M-5600 manufactured by TOAGOSEI Co., Ltd.), itaconic acid, crotonic acid, maleic acid, fumaric acid, vinyl acetic acid, and anhydrides thereof. The examples also include polymers of which ethylenically unsaturated compound having a glycidyl group or hydroxyl group is added to the above-described copolymer, but is not limited thereto.

Among those illustrated above, the resin containing an ethylenically unsaturated bond is particularly preferably used because the resin forms a cross-link bonding together with a monomer so that excellent strength can be obtained, The monomer which can be used in formation of the light shielding part used in the present invention include, for example, multifunctional acrylate monomers, and a compound having two or more ethylenically unsaturated bond containing group, such as an acryl group and a methacryl group, can be used. Specific examples include ethylene glycol (meth)acrylate, diethylene glycol di(meth)acrylate, propylene glycol di(meth)acrylate, dipropylene glycol di(meth) acrylate, polyethylene glycol di(meth)acrylate, polypropylene glycol di(meth)acrylate, hexane di(meth) acrylate, neopenzyl glycol di(meth)acrylate, glycerin di(meth)acrylate, glycerin tri (meth)acrylate, trimethylol propane tri(meth)acrylate, 1,4-butanediol diacrylate, pentaerythritol (meth)acrylate, pentaerythritol tri(meth)acrylate, pentaerythritol tetra(meth)acrylate, dipentaerythritol hexa(meth) acrylate, dipentaerythritol penta(meth)acrylate etc.

The multifunctional acrylate monomer may be used as a mixture of two or more thereof. In the present invention, (meth)acryl refers to either acryl or methacryl, and (meth) acrylate refers to either an acrylate group or a methacrylate group.

As the photo-initiator which can be used in the present invention, a photoradical polymerization initiator which can be activated with UV rays, ionizing radiations, visible lights or energy lights of other wavelengths, particularly 365 nm or shorter can be listed. Specific examples of such photopolymerization initiators include benzophenone, methyl o-benzoyl benzoate, 4,4-bis(dimethylamine)benzophenone, 4,4-bis(diethylamine)benzophenone, α-aminoacetophenone, 4,4-dichlorobenzophenone, 4-benzoyl-4-methyl diphenyl ketone, dibenzyl ketone, fluorenone, 2,2-diethoxy acetophenone, 2,2-dimethoxy-2-phenyl acetophenone, 2-hydroxy-2-methyl propiophenone, p-tert-butyldichloroacetophenone, thioxanthone, 2-methyl thioxanthone, 2-chlorothioxanthone, 2-isopropyl thioxanthone, diethyl thioxanthone, benzyl dimethyl ketal, benzyl methoxy ethyl acetal, benzoin methyl ether, benzoin butyl ether, anthraquinone, 2-tert-butyl anthraquinone, 2-amyl anthraquinone, β-chloroanthraquinone, anthrone, benzanthrone, dibenzsuberone, methylene anthrone, 4-azidobenzylacetophenone, 2,6-bis(p-azidobenzylidene)cyclohexane, 2,6-bis(p-azidobenzylidene)-4-methyl cyclohexanone, 2-phenyl-1,2-butadione-2-(o-methoxycarbonyl)oxime, 1-phenyl-propanedione-2-(o-ethoxycarbonyl)oxime, 1,3-diphenyl-propanetrione-2-(o-ethoxycarbonyl)oxime, 1-phenyl-3-ethoxy-propanetrione-2-(o-benzoyl)oxime, Michler's ketone, 2-methyl-1-[4-(methylthio) phenyl]-2-morpholinopropan-1-one, 2-benzyl-2-dimethylamino-1-(4-morpholinophenyl)-butanone, naphthalene sulfonyl chloride, quinoline sulfonyl chloride, n-phenylthioacridone, 4,4-azobisisobutyronitrile, diphenyl disulfide, benzothiazole disulfide, triphenyl phosphine, camphor quinone, N1717 manufactured by Adeka, carbon tetrabromide, tribromophenyl sulfone, benzoin peroxide, eosin, a combination of photo-reducing dye such as methylene blue and a reducing agent such as ascorbic acid or triethanol amine, and the like. In the present invention, these photopolymerization initiators can be used alone or as a mixture of two or more thereof.

2. Pixel Part

Next, the pixel part used in the present invention is described. The pixel part used in the present invention is not particularly limited as long as it can be formed at an opening of the light shielding part. For example, it can be formed in a known arrangement of e.g. stripe type, mosaic type, triangle type or 4-pixel arrangement type by using a 3-color (red (R), green (G), blue (B)) pixel part forming composition etc., and a colored area can be arbitrarily established. The opening refers to a region on a transparent substrate where the light shielding part is not formed.

The thickness of the pixel part formed in the present invention is selected suitably depending on an objective color filter, and is usually about 1.0 µm to 3.0 µm, particularly about 1.2 µm to 2.5 µm.

The pixel part used in the present invention can be formed by methods used in manufacturing of a general color filter, such as photolithography method or ink jet method. The material of the pixel part used in the present invention can be the same as in a pixel part used in a general color filter. Therefore, detailed description thereof is omitted.

3. Transparent Substrate

Next, the transparent substrate used in the present invention is described. The transparent substrate used in the present invention is not particularly limited as long as it is generally used in a color filter. Quartz glass, Pyrex (registered trademark) glass, a transparent rigid material having no plasticity such as a synthetic quartz plate, or transparent flexible material having plasticity such as a transparent resin film and an optical resin plate can be used.

4. Color Filter

The color filter in the present invention is not particularly limited as long as it has the light shielding part with the above-described edge side shape and the pixel part formed on the above-described transparent substrate. If necessary, for example, a protective layer, an electrode layer etc. may be formed thereon.

B. Liquid Crystal Display

Next, the liquid crystal display of the present invention is described. The liquid crystal display of the present invention is characterized by using the above-described color filter. In the present invention, since the above-described color filter is used, light leakage, due to the pixel part formed exceeding from a transparent electrode formed on an opposing substrate in a liquid crystal display, can be prevented so that a high-quality color filter can be provided.

In such liquid crystal display, for example, the color filter and the substrate on a liquid crystal driving side are opposed to each other, and a liquid crystal is encapsulated in between the color filter and the substrate on a liquid crystal driving side.

The substrate on a liquid crystal driving side, the liquid crystal and the like used in the liquid crystal display of the present invention can be the same as those used in a general liquid crystal display. Therefore, detailed description thereof is omitted.

C. Method for Manufacturing Color Filter

Next, the method for manufacturing a color filter in the present invention is described. In the method for manufacturing the color filter according to the present invention, there are two embodiments. In either embodiment, a color filter, wherein the standard deviation from the approximate line, in the edge side of the light shielding part, is in the above-described range when the edge side shape of the light shielding part is converted into coordinate data, and the distance between adjacent upper apexes and the distance between adjacent lower apexes are a predetermined value or more, can be manufactured. And when the manufactured color filter is used in a liquid crystal display, the color filter can act as a color filter with no light leakage, in which no pseudo-defects are detected in defect inspection of the pixel part.

Hereinafter, the two embodiments are separately described in detail.

1. First Embodiment

First, the first embodiment of the method for manufacturing a color filter according to the present invention is described. The first embodiment of the method for manufacturing a color filter according to the present invention is a method for manufacturing a color filter, wherein the color filter comprises: a transparent substrate; a light shielding part, formed on the transparent substrate, containing at least a light shielding material and a resin; and a pixel part formed at an opening of the light shielding part on the transparent substrate, and the method for manufacturing a color filter comprises a selecting step in which following color filter is selected: a color filter characterized in that, when an edge side shape, in a predetermined range of length, of the light shielding part is converted into coordinate data having coordinate points in a predetermined range of points, and an approximate line is calculated from the coordinate points by least-square method, a standard deviation $$\sigma\left(=\sqrt{\frac{1}{n}\sum_i X_i^2}\right)$$

(wherein n is a number of the coordinate points in the coordinate data), when $X_i$ is a distance from each coordinate point to the approximate line, is a predetermined value or less, and in a graph of the coordinate data, when an apex of a peak projecting upward is referred to as an upper apex and an apex of an peak projecting downward is referred to as a lower apex, among the peaks whose distance from the approximate line is a predetermined value or more, a distant between the adjacent upper apexes and a distant between the adjacent lower apexes are a predetermined value or more on average.

The present embodiment of the method for manufacturing a color filter has the selecting step of selecting those having the above-described edge side of the light shielding part. Therefore, only the color filters, wherein the standard deviation σ from the approximate line is in the predetermined range when the edge side shape of the light shielding part is converted into coordinate data, and the distance between adjacent upper apexes and the distance between adjacent lower apexes are the predetermined value or more on average. Accordingly, it is possible to efficiently manufacture a high-quality color filter, wherein light leakage due to the pixel par formed exceeding from a transparent electrode of an opposing substrate when used in a liquid crystal display, and defection of the pseudo-defects in pixel part inspection can be prevented. Hereinafter, the selecting step in this embodiment is described in detail.

(Selecting Step)

The selecting step in this embodiment of the method for manufacturing a color filter is a step of selecting a color filter characterized in that, when an edge side shape, in the predetermined range of length, of the light shielding part is converted into coordinate data having coordinate points in the predetermined range of points, and an approximate line is calculated from the coordinate points by least-square method, a standard deviation $$\sigma\left( = \sqrt{\frac{1}{n}\sum_i X_i^2} \right)$$

(wherein n is a number of the coordinate points in the coordinate data), when $X_i$ is a distance from each coordinate point to the approximate line, is the predetermined value or less, and in a graph of the coordinate data, when an apex of a peak projecting upward is referred to as an upper apex and an apex of an peak projecting downward is referred to as a lower apex, among the peaks whose distance from the approximate line is the predetermined value or more, a distant between the adjacent upper apexes and a distant between the adjacent lower apexes are the predetermined value or more on average.

In this embodiment, 3 pixels to 100 pixels, particularly 5 pixels to 30 pixels, in one color filter are measured for the edge side shape of the light shielding part. And the edge side shape of each pixel is measured by selecting the most ragged part of the linear part in a pixel is selected by eye observation, and a range of 100 µm to 200 µm is measured. In this step, only the color filters having the predetermined shape in every measured edge side of the light shielding part is selected.

In this embodiment, in a combination of the distance measured in the above-described range and the number of coordinate data in the below-described range, when at least one of the below-described standard deviation, the distance between adjacent upper apexes and the distance between adjacent lower apexes are within the below-described range, the color filter is referred to have the above-described shape.

The method for converting the edge side shape of the light shielding part into coordinate data includes: a method wherein an edge of the edge side shape of predetermined length is detected by a short-measure measuring instrument or a 2-dimensional coordinate measuring instrument, and each detected point is converted into absolute-size coordinates; or a method wherein an edge is detected by taking a photograph of the edge side in and subjecting the photograph to image processing, and after resoluting into points, the coordinates of each of 1000 to 10000 points are determined.

The standard deviation is obtained by calculating an approximate line, by the least-square method, from the coordinate points obtained by the above-described methods, and then, calculating the following standard deviation:

$$\sigma\left( = \sqrt{\frac{1}{n}\sum_i X_i^2} \right)$$

wherein $X_i$ is the distance from each coordinate point to the approximate line. In the above, n is the number of the coordinate points in the coordinate data. In the present embodiment, the standard deviation a is preferably 0.2 or less. Thereby, the width of the ragged part of the edge side of the light shielding part can be reduced.

In peaks that are deviating from the approximate line by 1.0 µm or more, an average of each distance between adjacent upper apexes and each distance between adjacent lower apexes is preferably 5.0 µm or more, more preferably in a range of 10 µm to 200 µm. Significantly ragged parts can thereby be reduced as a whole.

The above-described selecting step can be carried out just after the shielding part is formed, or for example, the selecting step can be carried out after the pixel part is formed at the opening of the shielding part.

(Others)

This embodiment may comprise a light shielding part forming step of forming a light shielding part on a transparent substrate or a pixel part forming step of forming a pixel part at an opening of the light shielding part, in addition to the above-described selecting step. The light shielding part forming step and the pixel part forming step can be the same as those in a general method for manufacturing a color filter, and thus detailed description thereof is omitted. In the step of forming the light shielding part, the light shielding part is preferably formed by the method described in the column of the light shielding part in "A. Color filter" such that the edge side of the light shielding part is in the range selected in the above-described selecting step. Thereby, the color filter can be manufactured efficiently.

The transparent substrate, the pixel part, the light shielding part, etc. used in this embodiment can be the same as those described in the above "A. Color filter", so detailed description thereof is omitted.

2. Second Embodiment

Next, the second embodiment of the method for manufacturing a color filter according to the present invention is described. The second embodiment of the method for manufacturing a color filter according to the present invention is a method for manufacturing a color filter, wherein the color filter comprises: a transparent substrate; a light shielding part, formed on the transparent substrate, containing at least a light shielding material and a resin; and a pixel part formed at an opening of the light shielding part on the transparent substrate, and the method for manufacturing a color filter comprises: a pre-baking step of coating a light shielding part-forming material, containing a light shielding material and a resin, onto the transparent substrate and heating thereof;

a light exposing step of exposing the heated light shielding part-forming material, to light, in a light shielding part forming pattern;

a developing step of removing the light shielding part-forming material of an insoluble part with a shower; and an adjusting step of adjusting conditions in each of the said steps preliminarily so that, when an edge side shape, in the predetermined range of length, of the formed light shielding part is converted into coordinate data having coordinate points in the predetermined range of points, and an approximate line is calculated from the coordinate points by least-square method, a standard deviation $$\sigma\left( = \sqrt{\frac{1}{n}\sum_i X_i^2} \right)$$

(wherein n is a number of the coordinate points in the coordinate data), when $X_i$ is a distance from each coordinate point to the approximate line, is the predetermined value or less; and in a graph of the coordinate data, when an apex of a peak projecting upward is referred to as an upper apex and an apex of an peak projecting downward is referred to as a lower apex, among the peaks whose distance from the approximate line is the predetermined value or more, a distant between the adjacent upper apexes and a distant between the adjacent lower apexes are the predetermined value or more on average.

In this embodiment, since the conditions for each step for forming the light shielding part are determined by the adjusting step, the shape of the light shielding part of the manufactured color filter can be the predetermined shape. Accordingly, when the manufactured color filter is used in a liquid crystal display, the light leakage, due to the ragged part in the edge side of the light shielding part, is prevented. Also, detection of pseudo-defects in the defect inspection of the pixel part can be prevented. Hereinafter, each step is described in detail.

(Adjusting Step)

First, the adjusting step in this embodiment of the method for manufacturing a color filter is described. The adjusting step in this embodiment of the method for manufacturing a color filter is a step of adjusting conditions in each of the below-described steps preliminarily before manufacturing the color filter so that, when the predetermined length of the edge side shape of the light shielding part is converted into coordinate data having the predetermined coordinate points, and an approximate line is calculated from the coordinate points by least-square method: a standard deviation $$\sigma\left(=\sqrt{\frac{1}{n}\sum_i X_i^2}\right)$$

(wherein n is a number of the coordinate points in the coordinate data), when $X_i$ is a distance from each coordinate point to the approximate line, is the predetermined value or less; and in a graph of the coordinate data, when an apex of a peak projecting upward is referred to as an upper apex and an apex of an peak projecting downward is referred to as a lower apex, among the peaks whose distance from the approximate line is the predetermined value or more, a distant between the adjacent upper apexes and a distant between the adjacent lower apexes are the predetermined value or more on average.

In this step, the light shielding part is formed by carrying out each of the below-described step under general conditions etc. for forming a light shielding part, and then, the edge side shape of the light shielding part is measured. Thereafter, the conditions to carrying out each step are adjusted such that, when the edge side shape of the light shielding part is converted into coordinate data, each of the above-described value is in the predetermined range. Thereby, the optimum conditions are determined in this step.

In this step, for example, the temperature, at which the ragged part is minimized, can be determined as the temperature in the pre-baking step by carrying out the below-described pre-baking step at some different temperatures. Moreover, in the below-described light exposing step, the position, at which the ragged part is minimized, can be determined by exposing light with a varying distance between a photomask and a light shielding part forming material. Further, in the below-described developing step, for example, the shower pressure for discharging a development solution can be adjusted to determine the shower pressure at which the ragged part is reduced, and the developing time can be adjusted. In this step, the conditions in each step are determined such that the edge side shape of the finally formed light shielding part is in the below-described range.

In this step, the edge side shape of a range of 100 μm to 200 μm in each of 3 pixels to 100 pixels of the light shielding part in a color filter is measured, and the conditions in each step are adjusted such that the edge side of every measured light shielding part has the predetermined shape. For the edge side measured in each pixel, the most ragged part of the linear part in a pixel is selected by eye observation.

In the present embodiment, the conditions in each step is determined such that, in a combination of the distance measured in the above-described range and the number of coordinate data in the below-described range, at least one of the below-described standard deviation, the distance between adjacent upper apexes and the distance between adjacent lower apexes is within the below-described range.

In the method for converting the edge side shape of the light shielding part into coordinate data, the edge side shape of predetermined length is converted into coordinate data having 1000 to 10000 coordinate points as in the manner as described above.

The standard deviation is obtained by calculating an approximate line, by the least-square method, from the coordinate points obtained by the above-described methods, and then, calculating the following standard deviation:

$$\sigma\left(=\sqrt{\frac{1}{n}\sum_i X_i^2}\right)$$

wherein $X_i$ is the distance from each coordinate point to the approximate line. In the above, n is the number of the coordinate points in the coordinate data. In the present embodiment, the standard deviation a is preferably 0.2 or less, more preferably 0.1 or less. Thereby, the width of the ragged part of the edge side of the light shielding part can be reduced.

In peaks that are deviating from the approximate line by 1.0 μm or more, an average of each distance between adjacent upper apexes and each distance between adjacent lower apexes is preferably 5.0 μm or more, more preferably 10 μm or more. Significantly ragged parts can thereby be reduced as a whole.

(Pre-Baking Step)

Next, the pre-baking step in the present embodiment is described. The pre-baking step in the present embodiment is a step of coating a light shielding part forming material, containing a light shielding material and a resin, onto the transparent substrate and heating thereof, wherein the heating is carried out at the temperature determined in the above-described adjusting step. When the temperature in the pre-baking step is too high, removal of the light shielding part forming material in an insoluble region will be difficult in the below-described developing step, thus the ragged part is likely to occur. On the other hand, when the temperature in this step is too low, curing will be insufficient in the below-described light exposure step, so that the light shielding part forming material in an object region is also removed by the developing step, thus the ragged part is likely to occur.

The light shielding part forming material can be coated by a general coating method. It is possible to employ, for example, spin coating method, die coating method, slit coating method, spray coating method, dip coating method, or a method wherein the light shielding part forming material formed previously on a film substrate is transferred onto the transparent substrate by energy such as heat, light, pressure or the like. The heating method is not particularly limited as long as it is a method capable of heating the light shielding part forming material at the predetermined temperature, and for example, heating can be carried out by using a hot plate, an oven etc.

Preferably, the heating time is determined suitably by the above-described adjusting step. The present step may include a step of drying the light shielding part forming material under vacuum, prior to heating.

The transparent substrate, the light shielding part forming material etc. used in the present step can be the same as described in the above item "A. Color filter", so detailed description thereof is omitted.

(Light Exposing Step)

Next, the light exposing step in the present embodiment is described. The light exposing step in the present embodiment is a step of exposing the light shielding part forming material heated in the pre-baking step, to light, in a light shielding part forming pattern by using a photomask etc. The light exposure is carried out under the arrangement and position of the photomask determined in the above-described adjusting step.

This is because when the arrangement distance between the photomask and the light shielding part forming material is not suitable, irradiated light is diffracted to blur the pattern, and the ragged part is likely to occur.

The light exposure in the present step is not particularly limited as long as it is carried out by a method capable of curing the light shielding part forming material, and the light exposure can be conducted by using an apparatus etc. used in a general light exposing step.

(Developing Step)

Next, the developing step in the present embodiment is described. The developing step in the present embodiment is a step of removing an insoluble part, other than the part cured in the light exposing step, with a shower to form the light shielding part in an objective shape. The development is carried out at the shower pressure and developing time determined by the above-described adjusting step.

When the shower pressure is too high or the developing time is too long, the light shielding part forming material is removed exceeding the objective region, thus the ragged part is likely to occur. On the other hand, when the developing time is too short, an insoluble part cannot be completely removed, thus the ragged part is likely to occur.

The shower used in the present step is not particularly limited as long as it can discharge a developing solution at objective pressure, and a shower used in a general developing step can be used. The developing solution used in the present step is selected suitably depending on the type of the light shielding part forming material etc.

The present embodiment may further include a post-baking step for accelerating the curing of the light shielding part forming material, after completing the developing step with the shower.

(Others)

The present embodiment may include a pixel part forming step of forming a pixel part at an opening of the light shielding part, etc., in addition to the adjusting step, the pre-baking step, the light exposing step, and the developing step. This pixel part forming step, etc., can be she same as in general methods for manufacturing a color filter, so detailed description thereof is omitted.

The present invention is not limited to the embodiments described above. The embodiments described above are merely illustrative, and any embodiments having substantially the same constitution and exhibiting the same function and effect as the technical ideas described in claims of the present invention is included in the technical scope of the present invention.

EXAMPLES

Hereinafter, the present invention is described in more detail referring to the Examples and Comparative Examples.

Example 1

As a substrate, a glass substrate of 0.7 mm in thickness (1737 glass manufactured by Corning) was prepared. This substrate was washed in a usual manner, and then alight shielding part forming composition having the following composition was coated onto the entire surfaced of one side of the substrate, then dried and heated (pre-baked) at 90° C. on a hot plate. Thereafter, a predetermined photomask was positioned such that the gap between the photomask and the light shielding part forming composition becomes 150 μm, followed by a light exposure of a exposing light quantity of 50 mJ/cm². Thereafter, the sample was developed at a developing pressure of 2.5 kgf and calcinated to form a light shielding part.

| (Light shielding part forming composition) | |
|---|---|
| Carbon black | 61 parts by weight |
| Photosensitive resin composition | 39 parts by weight |
| Methoxybutyl acetate | 300 parts by weight |

The above photosensitive resin composition has the following composition. The photosensitive resin compositions used in the following examples also have the following composition.

| (Photosensitive resin composition) | |
|---|---|
| Acrylic resin | 32 parts by weight |
| Dipentaerythritol hexaacryiate | 42 parts by weight |
| EPIKOTE 180S70 (manufactured by Mitsubishi Yuka Shell) | 18 parts by weight |
| Irg. 907 (manufactured by Ciba Specialty Chemicals) | 8 parts by weight |

Next, the edge side of the formed light shielding part, in the range of 200 μm, was converted into 10000 points of coordinate data. Thereafter, an approximate line was calculated from the respective coordinate points by the least-square method, to determine the standard deviation:

$$\sigma \left( = \sqrt{\frac{1}{n} \sum_i X_i^2} \right)$$

wherein $X_i$ is the distance from each coordinate point to the approximate line. The average distance between upper apexes, whose distance from the approximate curve is 1.0 μm or more, was measured. These results are shown in Table 1.

Next, each coating solution for a red pattern, a green pattern and a blue pattern having the following compositions was prepared. By using these, each of a red pattern, a green pattern and a blue pattern (thickness of each pattern, 1.7 μm) was formed in the pixel regions, by a known pigment dispersion method, to form a color filter.

| (Composition of red color pattern coating solution) | |
|---|---|
| PR254 dispersion | 33 parts by weight |
| Photosensitive resin composition | 67 parts by weight |
| Propylene glycol monomethyl ether acetate | 400 parts by weight |
| (Composition of green color pattern coating solution) | |
| PG36/PY150 dispersion | 34 parts by weight |
| Photosensitive resin composition | 66 parts by weight |
| Propylene glycol monomethyl ether acetate | 400 parts by weight |
| (Composition of blue color pattern coating solution) | |
| PB15:6/PV23 dispersion | 17 parts by weight |
| Photosensitive resin composition | 83 parts by weight |
| Propylene glycol monomethyl acetate | 400 parts by weight |

Comparative Example 1

A color filter was prepared in the same manner as in Example 1 except for that the pre-baking temperature was 80° C.

Comparative Example 2

A color filter was prepared in the same manner as in Example 1 except for that the pre-baking temperature was 70° C.

Comparative Example 3

A color filter was prepared in the same manner as in Example 1 except for that the exposing light quantity was 30 mJ/cm$^2$.

Comparative Example 4

A color filter was prepared in the same manner as in Example 1 except for that the exposing light quantity was 100 mJ/cm$^2$.

Example 2

A color filter was prepared in the same Manner as in Example 1 except for that the gap of the photomask at the time of light exposure was 100 μm.

Comparative Example 5

A color filter was prepared in the same manner as in Example 1 except for that the gap of the photomask at the time of light exposure was 250 μm.

Example 3

A color filter was prepared in the same manner as in Example 1 except for that the developing pressure at the time of development was 1.0 kgf.

Comparative Example 6

A color filter was prepared in the same manner as in Example 1 except for that the developing pressure at the time of development was 5.0 kgf.

In the above determination, a color filter with an overcoating layer and a photo-spacer formed thereon was used to prepare a liquid crystal display in IPS system. Black was displayed on the entire surface of this liquid crystal display, and when viewed from the front or the transverse direction, a display showing light leakage was given x, while a display not showing light leakage was given ○.

What is claimed is:

1. A color filter comprising: a transparent substrate; a light shielding part, formed on the transparent substrate, containing at least a light shielding material and a resin; and a pixel part formed at an opening of the light shielding part on the transparent substrate, wherein when an edge side shape, in a range of 100 μm to 200 μm in length, of the light shielding part is converted into coordinate data having coordinate points in a range of 1000 points to 10000 points, and an approximate line is calculated from the coordinate points by least-square method, and a standard deviation of:

$$\sigma\left(=\sqrt{\frac{1}{n}\sum_i X_i^2}\right)$$

wherein n is a number of the coordinate points in the coordinate data, wherein $X_i$ is a distance from each coordinate point to the approximate line, and wherein the calculated standard deviation is 0.2 or less; and in a graph of the coordinate data, when an apex of a peak projecting upward is referred to as an upper apex and an apex of an peak projecting downward is referred to as a lower apex, among peaks whose distance from the approximate line is 1.0 μm or more, a distant between the adjacent upper apexes and a distant between the adjacent lower apexes are 5.0 μm or more on average.

2. A liquid crystal display using the color filter according to claim 1.

3. A method for manufacturing a color filter, wherein the color filter comprises: a transparent substrate; a light shielding part, formed on the transparent substrate, containing at least a light shielding material and a resin; and a pixel part formed at an opening of the light shielding part on the transparent substrate, and the method for manufacturing a color filter comprises a selecting step in which following color filter is selected;

TABLE 1

| | Pre-baking temperature | Exposing light quantity | Exposing light gap | Developing pressure | σ | Adjacent upper apexes deviating from the average by the predetermined value or more | Determination |
|---|---|---|---|---|---|---|---|
| Example 1 | 90° C. | 50 mJ/cm$^2$ | 150 μm | 2.5 kgf | 0.18 | 5.4 μm | ○ |
| Example 2 | 90° C. | 50 mJ/cm$^2$ | 100 μm | 2.5 kgf | 0.11 | 5.8 μm | ○ |
| Example 3 | 90° C. | 50 mJ/cm$^2$ | 150 μm | 1.0 kgf | 0.15 | 5.5 μm | ○ |
| Comparative Example 1 | 80° C. | 50 mJ/cm$^2$ | 150 μm | 2.5 kgf | 0.34 | 5.5 μm | X |
| Comparative Example 2 | 70° C. | 50 mJ/cm$^2$ | 150 μm | 2.5 kgf | 0.42 | 0.9 μm | X |
| Comparative Example 3 | 90° C. | 30 mJ/cm$^2$ | 150 μm | 2.5 kgf | 0.45 | 6.3 μm | X |
| Comparative Example 4 | 90° C. | 100 mJ/cm$^2$ | 150 μm | 2.5 kgf | 0.15 | 0.8 μm | X |
| Comparative Example 5 | 90° C. | 50 mJ/cm$^2$ | 250 μm | 2.5 kgf | 0.26 | 5.1 μm | X |
| Comparative Example 6 | 90° C. | 50 mJ/cm$^2$ | 150 μm | 2.5 kgf | 0.58 | 0.8 μm | X | a color filter characterized in that, when an edge side shape, in a range of 100 µm to 200 µm in length, of the light shielding part is converted into coordinate data having coordinate points in a range of 1000 points to 10000 points. and an approximate line is calculated from the coordinate points by least-square method, and a standard deviation of:

$$\sigma\left(=\sqrt{\frac{1}{n}\sum_i X_i^2}\right)$$

wherein n is a number of the coordinate points in the coordinate data, wherein $X_i$ is a distance from each coordinate point to the approximate line, and wherein the calculated standard deviation is 0.2 or less, and in a graph of the coordinate data, when an apex of a peak projecting upward is referred to as an upper apex and an apex of an peak projecting downward is referred to as a lower apex, among the peaks whose distance from the approximate line is 1.0 µm or more, a distant between the adjacent upper apexes and a distant between the adjacent lower apexes are 5.0 µm or more on average.

4. A method for manufacturing a color filter, wherein the color filter comprises: a transparent substrate; a light shielding part, formed on the transparent substrate, containing at least a light shielding material and a resin; and a pixel part formed at an opening of the light shielding part on the transparent substrate, and the method for manufacturing a color filter comprises: a pre-baking step of coating a light shielding part forming material, containing a light shielding material and a resin, onto the transparent substrate and heating and heating thereof;

a light exposing step of exposing the heated light shielding part forming material, to light, in a light shielding part forming pattern;

a developing step of removing the light shielding part forming material of an insoluble part with a shower, and an adjusting step of adjusting conditions in each of the said steps preliminarily so that, when an edge side shape, in a range of 100 µm to 200 µm in length, of the formed light shielding part is converted into coordinate data having coordinate paints in a range of 1000 points to 10000 points, and an approximate line is calculated from the coordinate points by least-square method, and a standard deviation of:

$$\sigma\left(=\sqrt{\frac{1}{n}\sum_i X_i^2}\right)$$

wherein n is a number of the coordinate points in the coordinate data, wherein $X_i$ is a distance from each coordinate point to the approximate line, and wherein the calculated standard deviation is 0.2 or less, and in a graph of the coordinate data, when an apex of a peak projecting upward is referred to as an upper apex and an apex projecting upward is referred to as an upper apex and an apex of an peak projecting downward is referred to as an lower apex, among the peaks whose distance from the approximate line is 1.0 µm or more, a distant between the adjacent upper apexes and a distant between the adjacent lower apexes are 5.0 µm or more on average.

* * * * *